Sept. 3, 1963

R. L. MIGHELL 3,102,598

WING GANG COUPLING

Filed June 8, 1961

INVENTOR:
Russell L. Mighell
BY
Eberhard E. Wettey
Atty.

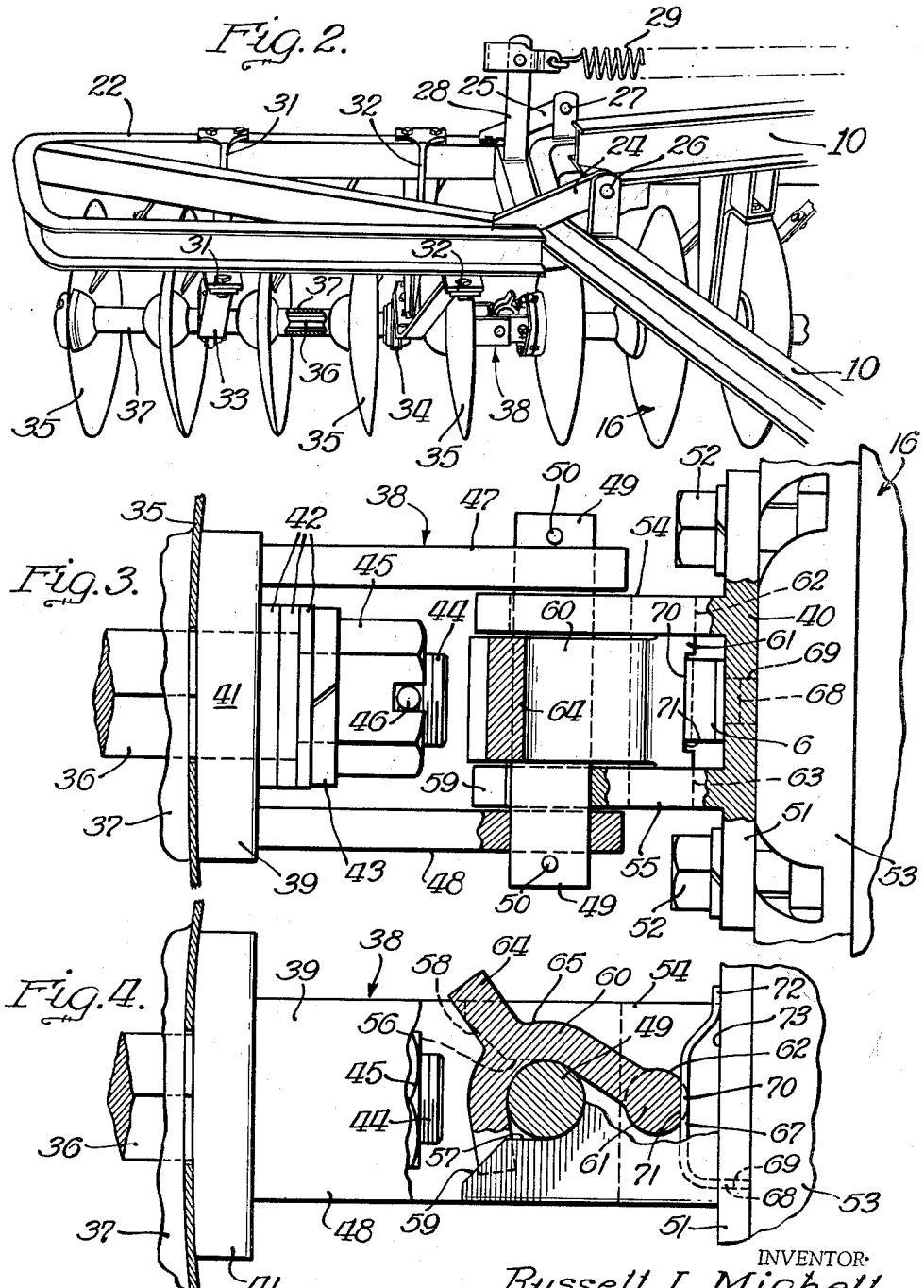

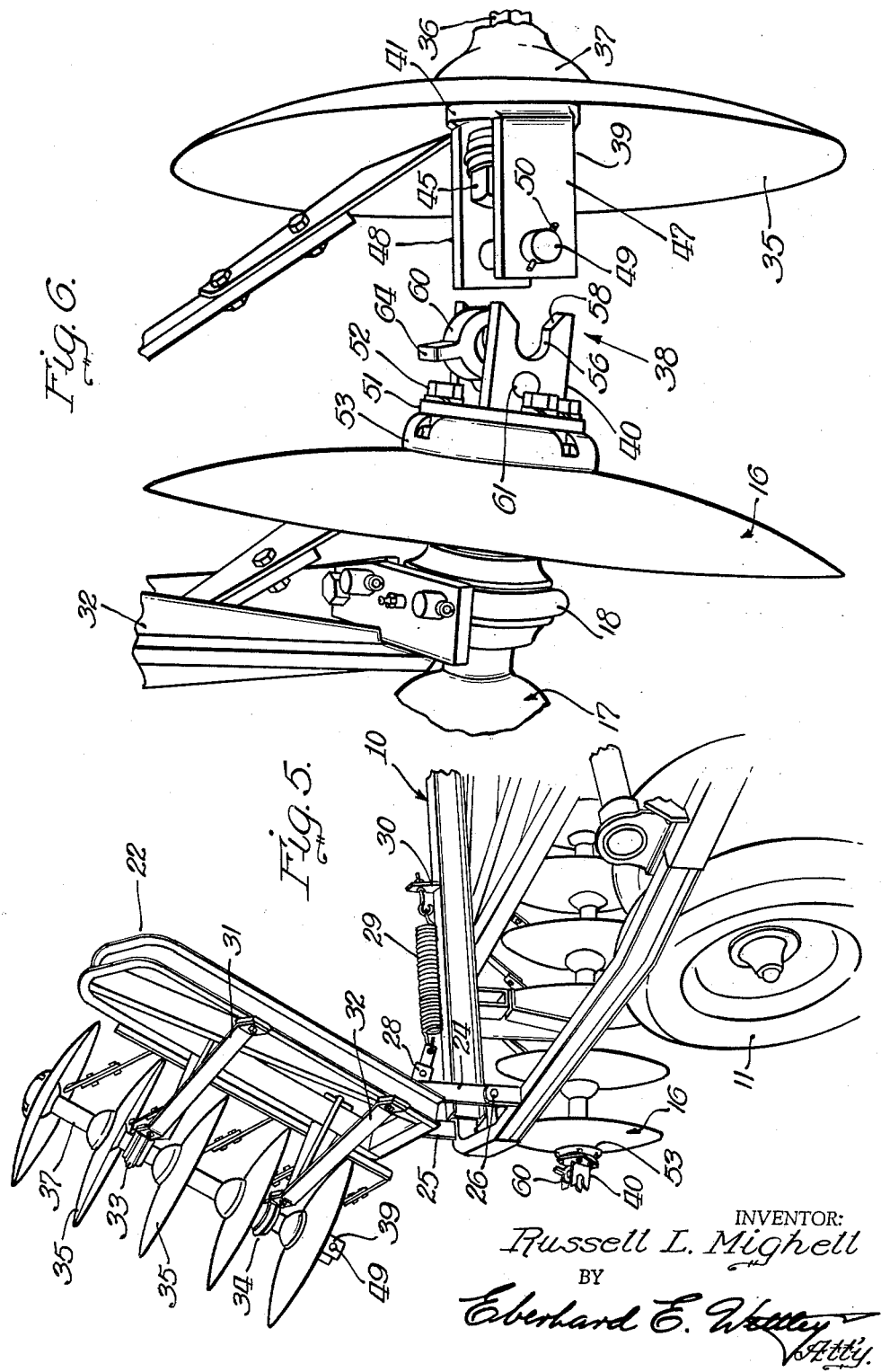

Sept. 3, 1963     R. L. MIGHELL     3,102,598
WING GANG COUPLING
Filed June 8, 1961                               4 Sheets-Sheet 4
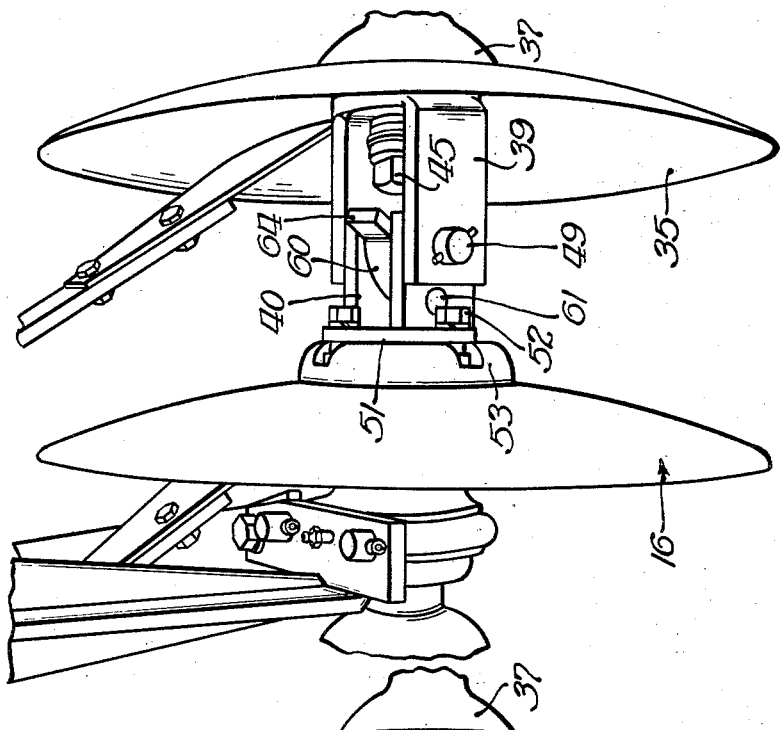
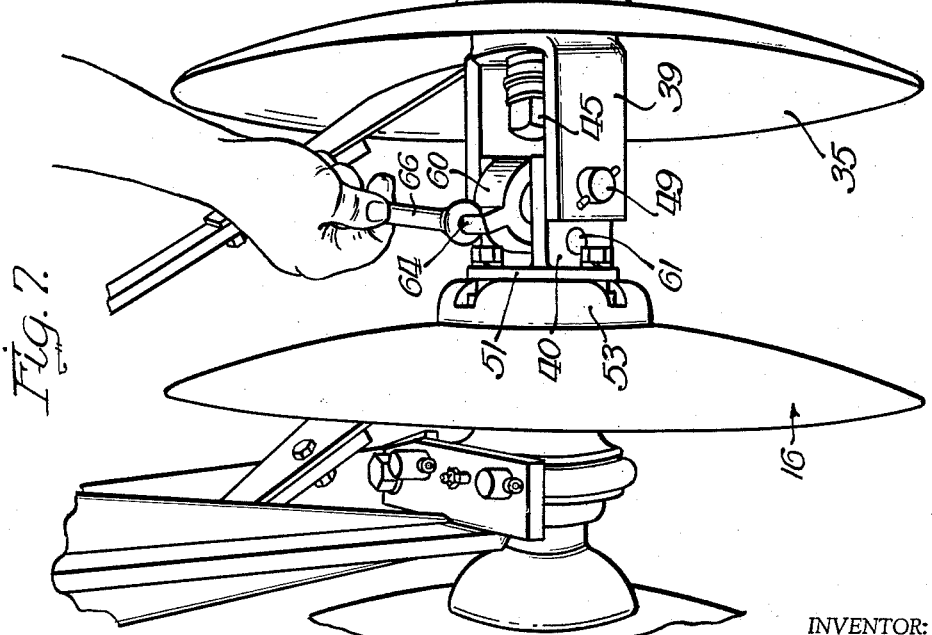
INVENTOR:
Russell L. Mighell
BY
Eberhard E. Wettey
Atty.

United States Patent Office 3,102,598
Patented Sept. 3, 1963

3,102,598
WING GANG COUPLING
Russell L. Mighell, Kewanee, Ill., assignor to Kewanee Machinery & Conveyor Company, Kewanee, Ill., a corporation of Illinois
Filed June 8, 1961, Ser. No. 115,779
10 Claims. (Cl. 172—568)

This invention relates to a releasable connection between independent generally aligned rotary tools of a farm implement to cause rotation of such tools in unison and to maintain such tools at given oriented working levels in relation to the ground.

Specifically, this invention is directed to a separable coupling established between the disks of a swingable wing gang of a disk harrow and an adjacent disk gang that is carried by the main frame structure of a disk harrow implement.

It is the general practice in oversized disk harrows to provide a main implement frame having disk supporting means and to supplement such equipment with auxiliary wing gangs carrying disks on opposite sides of the implement to cooperate and to extend the total overall width of the disk working capacity of such implement. The frames of the wing gangs are pivoted on the side portions of the main implement frame and when they are disposed in working positions they occupy positions projected in outboard relation with respect to the main frame gang or gangs as the case may be.

A number of problems have arisen with the use of such freely extended wing gangs that have been objectionable and a constant source of annoyance. It has been difficult to keep the wing disk gangs in good working alignment with their adjacent main frame disk gangs. The wing gangs at the outer ends of the front main gangs have a tendency to disk deeper than the main gangs. The wing gangs adjacent the ends of the rear main frame disk gangs presented the tendency to raise out of the ground in relation to their adjacent main frame gangs. These opposite tendencies are developed due to the angularity of the disk harrow sections which normally angle inwardly and rearwardly at the forward part of the harrow and angle outwardly and rearwardly at the rear part of the harrow.

Greater frame stresses are thus created and transmitted under these conditions of operation resulting in excessive frame deflection calling for heavier structural elements in order to sustain a good rigid working implement. Lock down clamps are needed to keep each wing gang in an extended operative position outwardly of its adjacent frame carried disk gang. Furthermore, the disks of the wing gang and disks of the main gang had independent rotative actions causing a further deviation between such gangs resulting in more irregularity in the working of the ground by such an implement. Additional frame stresses resulted therefrom.

One of the objects of the present invention is to provide a coupling between the wing gang and the main gang to orient such gangs when they are disposed in operative positions and to hold such gangs in given spaced relation to each other to substantially function as would a single long gang.

Another object is to establish a coupling of this type which is quickly fully locked to fix the aligned gangs and to provide a simple means to lock or to unlock such gangs permitting rigid attachment or convenient separation of the disk units. All auxiliary lock down clamps are eliminated with the coupling of this invention.

Another object is to provide a coupling between a supplemental movable implement gang and a fixed main implement gang which is constructed of completely integrated assembled parts to eliminate the use of all loose parts that could be lost or misplaced.

A further object is to provide a coupling of the character noted which not only rigidly orients and aligns the axes of the supports of the cooperative rotative working tools, but a coupling that serves to lock such independent tool assemblies for concerted rotation to establish a multiple rotary tool ground working implement that subjects the ground to uniform cultivation or treatment across the entire width of the implement.

A still further object is the provision of a wing gang coupling that incorporates a multiple point contact arrangement between the separable parts of the coupling including spaced orientation members disposed to opposite sides of the common axis of rotation of the connected gangs supplemented by a third intermediate locking arrangement located between such spaced orientation members. This type of an assembly establishes rigidity in all radial directions at the coupling and also forms a positive rotatable drive means to transmit motion between the connected coupling assemblies so that all coupled ground working units operate in unison.

Other objects and advantages relating to the wing gang coupling of the present invention shall hereinafter appear in or become apparent from the following detailed description of the device disclosed having reference to the accompanying drawings forming a part of this specification.

In the drawings:

FIG. 2 is a fragmentary enlarged perspective view looking from the front of the implement and at the forward face of the right rear wing gang portion of the implement;

FIG. 3 is a plan view of the coupling structure per se as it appears in assembled relation to the structure shown in FIG. 2, certain parts being broken away and illustrated in section;

FIG. 4 is a side elevational view of the coupling as viewed at right angles to the coupling shown in FIG. 3, certain portions of the coupling being broken away and illustrated in section to better disclose constructional details;

FIG. 5 is another fragmentary perspective view of the right rear wing gang as it would appear in a rotated upright position prior to a fold over position upon the main implement frame;

FIG. 6 is an enlarged perspective view of the coupling considered prior to union or immediately after separation, only the immediate adjoining elements being shown by way of illustration;

Figure 1:
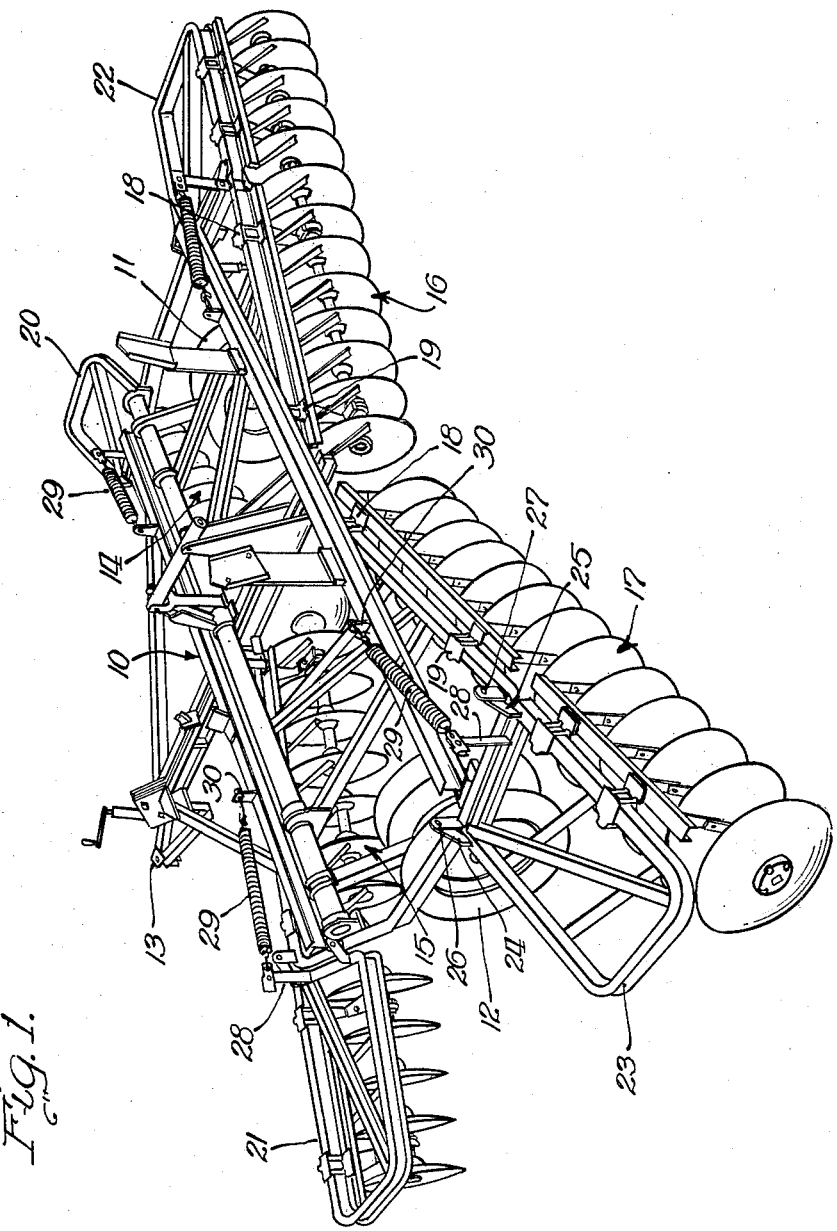
FIG. 1 is a diagrammatic perspective view of a disk harrow implement embodying the present invention, the implement being viewed from the left rear corner considering the upper left far side as the front of the implement for a reference point from which the right and left sides may be determined.

FIG. 7 is another perspective view of the coupling with the orientation parts thereof seated for orientation; this view also showing how the locking operation may be accomplished; and FIG. 8 is a third perspective view of the coupling added to the FIGS. 6 and 7 series, the latter view showing a fully locked coupling to show how such a unit functions when in operative relation under the extended effective implement tool working condition.

Referring to FIG. 1, an implement such as a disk harrow is here shown comprising a main frame 10 with a pair of swingable wheel units 11 and 12 having appropriate means to raise and lower the frame 10 with its tools. A towing tongue 13 is located at the forward end of the frame of the implement. The frame 10 carries a front pair of disk ganges 14 and 15 (right and left) and another pair of rear disk gangs 16 and 17 (right and left). The front disk gang pair 14 and 15 each angles inwardly and to the rear wherein the earth resistance causes axial inward thrust on each gang assembly, while the rear disk gang pair 16 and 17 each angles rearwardly and outwardly and are subjected to opposite outward thrust directed axially of each gang.

The gangs 14 to 17 are suspended by suitable rigid brackets such as 18 and 19 in FIG. 1, which maintain the positions of the gangs in their designed relations to the main frame 10. The gangs described are freely rotatable on shaft means in suitable bearings on the brackets.

The wing gangs are best shown in FIG. 1 and may be generally identified according to their individual frames 20 and 21 at the right and left sides of gangs 14 and 15, and individual frames 22 and 23 at the right and left sides of gangs 16 and 17.

Since the wing gang assemblies are all substantially identical in general structure, the same reference characters will be applied to the similar corresponding parts of these assemblies.

Each wing gang is pivotally supported on the main implement frame 10 and in a manner wherein each wing gang frame can be swung from an operative outboard relation as shown in FIG. 1 to a stored position over the main frame, FIG. 5 showing an intermediate raised position of a wing frame.

The pivotal arrangement comprises a pair of hinges 24 and 25 having aligned pivot pins 26 and 27 that provide the common axes of swing of the gang frame 22, for example. Each frame 20 to 23 is provided with an upright bracket arm 28 to receive one end of a counterbalancing spring 29, a second bracket arm 30 being fastened upon frame 10 to receive the other end of spring 29. When the implement is rigged for operation as in FIG. 1, springs 29 are under tension and ready to exert a pull on each corresponding wing gang frame when the latter is free to pivot on its hinge arrangement.

Each wing gang frame as in FIG. 2 carries suitable brackets like 31 and 32 to suspend bearings 33 and 34 that support the wing gang disks 35 on a suitable common shaft 36 including spacing spools 37 to separate and position the disks 35.

The coupling of the present invention is best illustrated at 38 in FIGS. 2, 3 and 4, wherein details of the assembled unit are well shown. The coupling 38 comprises a pair of coacting U-shaped brackets 39 and 40 with the open ends of these brackets placed toward each other. Bracket 39 has a base 41 seated against a disk 35 and shaft 36 of the wing gang unit passes through an opening in base 41 and through suitable washers 42 and locking washer 43 providing a threaded securing stud 44 for the attaching nut 45 that rigidly fastens the bracket 39 adjacent the face of the wing gang disk 35 with a pin such as 46 locking the nut 45 to shaft 36.

The bracket 39 provides flat sided parallel arms 47 and 48 that support a transverse pin 49 in a position radial with respect to the axis of the U-shaped bracket 39, suitable locking pins such as 50 holding pin 49 in place.

The coacting U-shaped bracket 40 also provides a securing base 51 that is bolted by means of bolt members 52 to a slotted bumper 53 that forms the end piece of the implement gang 16 and of the assembled shaft structure of this gang. Bracket 40 has spaced flat sided parallel arms 54 and 55 that guidedly fit between arms 47 and 48 of member 39. Each arm 54 and 55 has end slots 56 and 57 with bevelled entrance guide walls 58 and 59 best illustrated in FIGS. 3 and 4. As in FIG. 4, the end slots 56 and 57 straddle pin 49 at points spaced to each side of the axial line of the coupling for both lateral and vertical stability between the coupled or joined brackets by reason of the interlocking bracket parts.

Latch means in the form of a swinging hook 60 is secured to a rocking pin 61 that rides in aligned openings 62 and 63 in the arms 54 and 55 of bracket 40. Hook 60 is flat edged and snugly positioned for swinging motion between arms 54 and 55 which provides a hook having a good width to lengthwise engage an extended part of the pin 49 for effective locking rigidity and to also well fill the remaining space between each of the adjacent pairs of arms of brackets 39 and 40 to render the coupling strong and less likely to become bent or damaged at the pin location of the arm ends.

A lug 64 is provided across the outer curved surface 65 on the hook 60 and extends upwardly, as in FIG. 4, or outwardly from the arm area to be in a position available for rocking hook 60 with its pin 61 to lock or unlock the coacting coupling units.

A hammer or similar tool may be used to rock hook 60 by means of lug 64, although an open ended wrench 66 may be best used on lug 65 by an operator in the manner shown in FIG. 7 to couple and uncouple the locking elements of the assembly 38.

Since the coupling is subjected to considerable vibration and also constitutes a turning structure, a detent means is embodied into the coupling to hold the hook 60 in its latched position with pin 49. The detent means comprises a spring 67 made with a tail piece 68 lodged in a slot 69 in base 51, the spring having a straight length 70 to bear against a flat surface area 71 on the periphery of pin 61. The free end 72 of the spring 67 rides upon and bears against the surface 73 of base 51 where it is slidable thereon while pin 61 is rotated.

While only one flat surface area 71 is shown on pin 61 in FIG. 4, it is contemplated that at least one other such surface may be provided on pin 61 to correspond with the total release position of the hook 60 if that should be desired or necessary. With the construction shown in FIG. 4, the friction of spring 67 on the surface of pin 61 will normally hold hook 60 in a rotated released position.

It should be understood that pin 49 on bracket 39 may need realigning after transport of the implement with the wings in retracted position. This may readily be done by a slight turn of the wing gang disks to establish pin 49 in a position wherein it will easily slip into the slots 56 and 57 in the bracket ends of arms 54 and 55 aided by the guiding bevel surfaces 58 and 59. Once pin 49 lies in the notched arms 54 and 55, hook 60 is then easily rotated to lock about pin 49 to latch the two related U-shaped brackets 39 and 40, with the hook being held in latched relation by the detent spring 67. In this manner, the coupling parts are positively held in firm and interlocked positions.

Positive dual rotation is insured between the coupled disk gangs with the arrangement described. No endwise separation or play exists and the brackets axially orient both gangs while preventing all relative out of line motion between the connected disk gangs.

The foregoing description covers the form of the invention disclosed in the drawings by way of illustration. Certain changes are contemplated and possible in the design of the elements shown as well as in the specific combinations developed without departure from the fundamental concept of this invention. The extent of such modifications shall, however, be governed by the breadth and scope of the language hereinafter appearing in the claims directed to the wing gang coupling of the present invention.

What I claim is:

1. In an agricultural implement, a first frame, a group of rotatably operable ground working elements connected with said frame to work the soil, a second frame, a group of rotatably operable ground working elements adapted for adjacent alignment with the aforesaid group of elements and connected with said second frame, mechanism joining said frames for relative movement therebetween from operative to inoperative positions and to actuate the respective groups of rotatable elements of each frame from adjacent aligned operable positions to separated inoperable positions, and an element coupling having coacting parts connected directly with each of said groups of elements to releasably connect the rotatably operable ground working elements of both of said frames for positive concerted rotary motion when the latter are shifted by the frames into operative positions with respect to each other for oriented and concerted action in the treatment of the soil by both sets of said rotatably operable ground working elements.

2. In an agricultural implement, a first frame, rotary ground working elements supported as a group from said frame to cultivate the soil, a second frame, other similar rotary ground working elements supported as a group from said second frame, apparatus connecting said frames for relative movement of said frames with respect to each other between a common operative position of all of said ground working elements and a separated inoperative position of said respective frame elements, and releasable attachment means having coacting complementary parts on each of the implement groups to join said groups for soil cultivation in rotational unison by all of said elements when said frames are oriented in operative relation with respect to each other.

3. In an agricultural implement, a first set of rotary ground working tools carried by said implement for rotation about a given axis and providing a given width of ground cultivation pattern for said implement, a second set of auxiliary rotary ground working tools connected with said implement through swingable means adapted to bodily carry said set of auxiliary tools from a stored position within the overall width covered by said first set of implement tools to an axial position aligned with the axis of rotation of said first set of rotary tools and beyond one side of said first set of implement tools to widen the total overall width of the ground cultivation pattern for said implement, and a separable coupling means having a fixed connection with said set of implement tools and a fixed connection with said set of auxiliary tools to establish a unitary resultant operative rotary ground working action by all of said tools upon a common axis of operation.

4. In an agricultural implement, a first group of ground working tools, a second group of ground working tools, pivotally connected frames to support the groups of tools, separation of said frames causing bodily separation of said groups of tools, and a coupling interposed between said tool groups to operatively join said groups for concerted operative action and to maintain all of the tools of said groups in predetermined relation with respect to said implement, said coupling including a releasable latch to lock the tool groups together, and resilient means connected with one of said frames to cause separation of said tool groups by said frames under release of said latch, said tools of said groups comprising rotary elements carried for turning on separate axes, and said coupling having orientation means for holding said operative axes of said tools in alignment including interlocking members to cause common concerted rotation of the tools in both of said groups.

5. In an agricultural implement, multiple assemblies of aligned revolving earth working tools carried by said implement, said assemblies each comprising ground working tools mounted for rotation with a first shaft supported on said implement and providing a given width of ground cultivation pattern, auxiliary ground working tools mounted for rotation with a second shaft supported on said implement including swingable means on the implement to bodily carry said auxiliary tools and the second shaft from a stored position within the overall width covered by said implement tools of the first shaft to a position beyond one side of said implement tools to align said shafts and to widen the total overall width of the ground cultivation pattern, and coupling means connected to rotate with said first shaft of the implement tools and connected to rotate with said second shaft of the auxiliary tools to establish a unitary common resultant rotative action for all of said tools carried by said first and second shafts, said coupling means comprising coacting bracket members connected with the first shaft of the ground working tools of the implement and with the second shaft of the auxiliary tools respectively, said brackets having parts thereof disposed in overlapping positions with one of said bracket members having axially open ended slots lying along a radial plane of the axes of the first and second shafts when aligned in operative positions and the other bracket member having a radially positioned pin thereon for engaging into said slots.

6. A wing gang coupling comprising, in combination, a main disk gang, a wing disk gang, pivotally connected frames to support said gangs respectively and arranged to move said gangs into axially aligned operative ground working positions from inoperative separated vertically disposed positions, and a coupling having members axially connected in fixed relation with each gang to operatively orient and to stabilize said gangs in aligned working positions and to prevent axial separation therebetween, said coupling members providing means to cause said gangs to rotate in unison about their aligned operative axes common to said gangs while said gangs are operatively joined by said coupling members.

7. In an agricultural implement having gangs with rotating tools thereon and relatively adjustable apparatus to align said tools of the gangs for concerted rotary ground cultivation comprising, in combination, a first gang with rotary tools thereon, a second gang with rotary tools thereon, and coupling means to releasably connect said rotary tools of said gangs, said coupling means comprising a bracket with projecting arms fixedly connected with the tools of said one gang to rotate with said tools thereon, a bracket with projecting arms fixedly connected with the tools of the other gang to rotate with the tools thereon, said arms having coacting parts thereon to engage together in overlapping positions with respect to each other to stabilize said brackets between the respective connected tools and to transmit rotary motion between said connected tools, and interlocking means on said rotary arms to maintain the arms in said nested and overlapping positions for the continuous concerted rotary operation of the aligned tools of said tool gangs.

8. In the combination of claim 7 with the addition of a latch means comprising a rockable hook on one bracket to engage said interlocking means for preventing separation of said means.

9. A coupling between axially alignable rotational disk harrow gangs comprising fixed members connected with a rotating part of each of the adjacent ends of the gangs and in axial relation thereon, one member having spaced abutment pieces thereon, said other member having a radial element to axially receive said abutment pieces, and a third member to releasably engage said radial element intermediate the contact positions of said spaced abutment pieces with said radial element.

10. A coupling as in claim 9 wherein said abutment pieces are provided to either side of the common axis of said disk gangs and said third member is operatively located on said common disk gang axis.

References Cited in the file of this patent
UNITED STATES PATENTS

| | | |
|---|---|---|
| 433,654 | Pridmore | Aug. 5, 1890 |
| 1,034,753 | Adix | Aug. 6, 1912 |
| 2,972,385 | Walberg | Feb. 21, 1961 |
| 2,974,738 | Walberg | Mar. 14, 1961 |